No. 882,981. PATENTED MAR. 24, 1908.
M. TURNER.
VEHICLE COUPLING.
APPLICATION FILED JUNE 5, 1906. RENEWED DEC. 23, 1907.

2 SHEETS—SHEET 1.

Witnesses
C. R. Thomas
F. B. MacNab

Inventor
M. Turner
By Chandler & Chandler
Attorneys

No. 882,981. PATENTED MAR. 24, 1908.
M. TURNER.
VEHICLE COUPLING.
APPLICATION FILED JUNE 5, 1906. RENEWED DEC. 23, 1907.

2 SHEETS—SHEET 2.

Witnesses
G. R. Thomas
F. B. MacHat

Inventor
M. Turner
By Chandler & Chandler
Attorneys

THE NORRIS PETERS CO., WASHINGTON, D. C.

UNITED STATES PATENT OFFICE.

MILES TURNER, OF STEAMBOAT SPRINGS, COLORADO.

VEHICLE-COUPLING.

No. 882,981. Specification of Letters Patent. Patented March 24, 1908.

Application filed June 5, 1906, Serial No. 320,355. Renewed December 23, 1907. Serial No. 407,714.

*To all whom it may concern:*

Be it known that I, MILES TURNER, a citizen of the United States, residing at Steamboat Springs, in the county of Routt, State of Colorado, have invented certain new and useful Improvements in Couplings; and I do hereby declare the following to be a full, clear, and exact description of the invention, such as will enable others skilled in the art to which it appertains to make and use the same.

This invention has reference to the running gears of the forward part of wagons and carriages.

It is the object of the invention to prevent the weakening and consequently to strengthen the essential parts of the running gears of vehicles by an improved construction and mode of operation whereby the piercing of the bolster and all its supports as well as the front axle by an abnormally large hole formed vertically through them for the king-bolt may be avoided, and the operation of the tongue in turning the wagon or drawing it out of a straight line may be made easier.

The invention consists in providing the bolster and its bearings of every kind as well as the front axle with a clip of steel that shall embrace the parts firmly, and be of a strength commensurate with its requirements, all of which clips are provided with a forward extension for the reception of the king-bolt and for affording a support and bearing for the inner or rearward end of the coupling pole or reach, all as will be hereinafter fully described with reference to the annexed drawings, forming a part of this specification, and subsequently pointed out in the subjoined claims.

Figure 1:
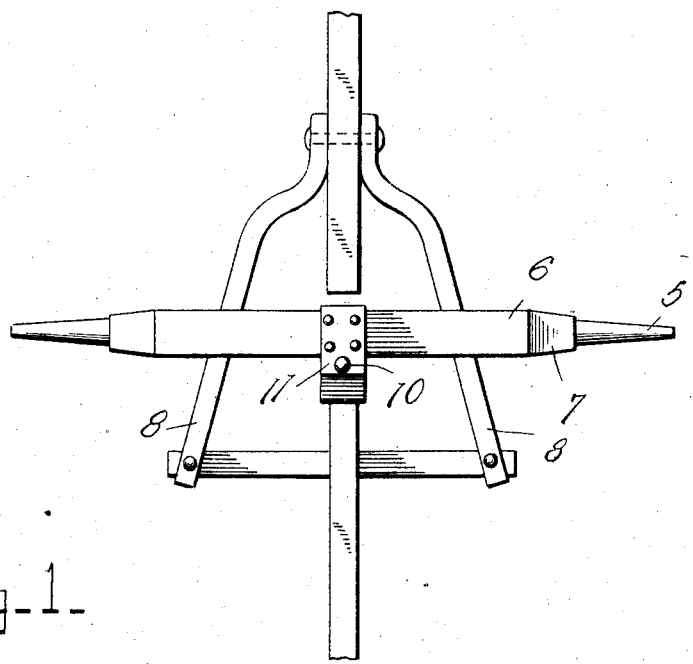
Figure 2:
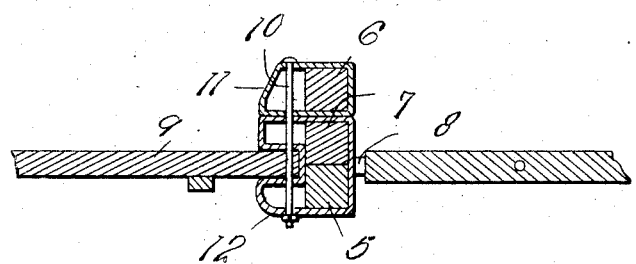
Figure 3:
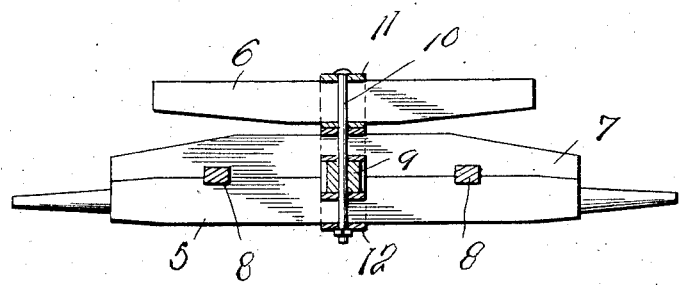
Figure 4:
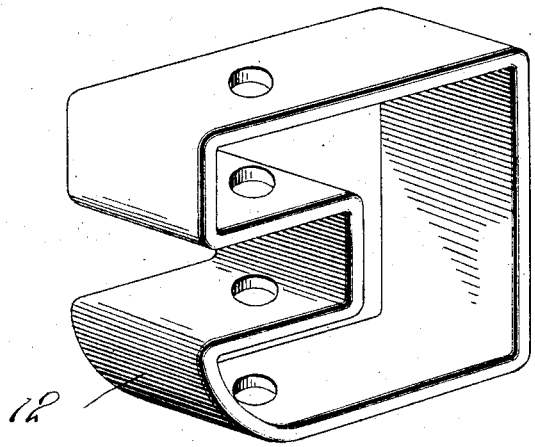

Of the said drawings:—Figure 1 is a plan view of the running gear or vehicle constructed according to my invention. Fig. 2 is a vertical sectional view taken on a line running centrally from front to rear through the bolster and its supports and the front axle, including the clips, the king-bolt being shown in elevation. Fig. 3 is a transverse sectional view of the same parts. Fig. 4 is a detail view showing a form of bearing for the support of the front end of the tongue or reach.

Similar figures of reference show similar parts in all of the views.

In the drawings, 5 designates the front axle.

6 is the bolster.

7 is the sand-board.

8 are the hounds.

9 is the coupling pole or reach, and 10 is the king-bolt.

All of the parts mentioned, as well as parts coacting with them are the same as in running gears now constructed excepting as hereinafter mentioned.

The bolster 6 is embraced at its center with a clip or broad band of steel of a size and strength commensurate with its requirements, which clip is secured to the bolster by bolts and nuts, as shown, and has an integral part of triangular or other suitable form extending rearward therefrom, as designated by 11. The sand-board has a somewhat similar clip secured to it at its center, excepting that it is made to embrace both the sand-board and front axle, and the rearward projection 12 thereof is constructed to afford a bearing for the front end of the coupling-pole or reach 9.

The bolts and nuts for securing the several parts in position vary somewhat as the form of parts with which they co-act vary, but all are substantially the same in function or mode of operation. A hole is formed vertically through the rearward extensions of the clips and the front end of the reach through which the king-bolt is extended vertically and upon which draft is made to draw the vehicle from place to place. The pole or reach rearward of the king-bolt rides on the hounds for a part of its support, substantially as is now done.

The sole object and purpose of my invention is to avoid the weakening effect that is occasioned to vehicle running gears by the formation of a large hole through the center of the essential parts of the forward portion of the running gear, for the reception of the king-bolt, making it necessary to construct the said parts of very large and heavy timbers merely to provide for the hole for the king-bolt.

In view of the facts last mentioned I do not confine myself to the form of clips for binding the bolster and its bearings and front axle together and providing for the reception of the king-bolt and the bearing for the front end of the reach or coupling-pole, since these may be greatly varied, and may be required to be different in form in one vehicle from what they are in another, the gist of the invention residing in the fact that clips or devices answering to their purpose, as explained, are provided to avoid the use of king-bolt holes through the bolster and its bearings and front axle; any form of clips overcoming the objections mentioned and securing the ends and purposes aimed at will therefore come within the realm of my improvements.

Having thus described my invention what I claim, is:—

The combination, with the bolster and a steel clip encompassing the same and extending rearward therefrom, of the axle and sand-board, a clip embracing both of the same and having a rearward extension indented centrally, the reach having its forward end seated in said indentation, the rearward extensions of said clips and the said end of the coupling pole being provided with vertically registering apertures, and a king-bolt extending through and secured in said apertures.

In testimony whereof, I affix my signature, in presence of two witnesses.

MILES TURNER.

Witnesses:
EZRA H. O'NEAL,
CHARLES M. IRVINEHART.